US006235838B1

(12) United States Patent
Wünsch et al.

(10) Patent No.: US 6,235,838 B1
(45) Date of Patent: May 22, 2001

(54) PROCESS FOR PREPARING POLYMERS FROM VINYLAROMATIC COMPOUNDS BY DISPERSION POLYMERIZATION

(75) Inventors: Josef Wünsch, Schifferstadt; Michael Schneider, Neustadt, both of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/341,285

(22) PCT Filed: Dec. 19, 1997

(86) PCT No.: PCT/EP97/07213

§ 371 Date: Jul. 8, 1999

§ 102(e) Date: Jul. 8, 1999

(87) PCT Pub. No.: WO98/30613

PCT Pub. Date: Jul. 16, 1998

(30) Foreign Application Priority Data

Jan. 9, 1997 (DE) .............................. 197 03 305

(51) Int. Cl.⁷ .................................................... C08G 63/48
(52) U.S. Cl. .................................................. 525/70
(58) Field of Search ................................... 525/70

(56) References Cited

U.S. PATENT DOCUMENTS 3,770,712  11/1973  Schwab .............................. 260/93.5

FOREIGN PATENT DOCUMENTS

| 4330969 | 3/1995 | (DE) . |
| 4420917 | 12/1995 | (DE) . |
| 210615 | 2/1987 | (EP) . |
| 361309 | 4/1990 | (EP) . |
| 389939 | 10/1990 | (EP) . |
| 535582 | 4/1993 | (EP) . |
| 584646 | 3/1994 | (EP) . |
| 2137676 | 12/1972 | (FR) . |

OTHER PUBLICATIONS

Awan et al., *J. Polymer Sci.*, Part A, Polymer Chemistry, vol. 34, pp. 2633–2649, 1996.

*Primary Examiner*—Terressa M. Boykin
(74) *Attorney, Agent, or Firm*—Keil & Weinkauf

(57) ABSTRACT

A process for preparing polymers of vinylaromatic compounds in dispersion comprises conducting the polymerization in the presence of a dispersing auxiliary and a catalyst obtainable from A) a transition metal complex of subgroups II to VIII, B) a cation-forming agent and C), if desired, an aluminum compound.

10 Claims, No Drawings

PROCESS FOR PREPARING POLYMERS FROM VINYLAROMATIC COMPOUNDS BY DISPERSION POLYMERIZATION

The invention relates to a process for preparing polymers of vinylaromatic compounds in dispersion in the presence of metallocene catalyst systems.

The polymers thereby obtainable can be used to produce fibers, films and moldings.

Polymerizing styrene in the presence of metallocene catalyst systems leads to polymers of high stereoregularity and is described at length, for example, in EP-A 0 210 615. Because of its high crystallinity, syndiotactic polystyrene has a very high melting point of about 270° C., high rigidity and tensile strength, dimensional stability, a low dielectric constant and high chemical stability. The profile of mechanical properties is retained even above the glass transition temperature.

In the metallocene-catalyzed polymerization of styrene, there is frequently crystallization of the resulting syndiotactic polystyrene starting at a level of only about 10% conversion. This leads firstly to the formation of deposits on the walls and secondly to an extreme viscosity rise during the polymerization, which makes handling and dissipation of the heat of reaction more difficult, especially on the industrial scale.

To solve this problem a variety of techniques using special reactors or extruders have been tried out. EP-A-0 535 582 describes a process for preparing syndiotactic polystyrene in a stirred bed of solids, which is able to reduce the wall deposits but not prevent them. The reactor has to be equipped with a special stirrer in order to produce a homogeneous fluidized bed. Temperature control is by way of partial evaporation of styrene by reduced pressure, using a complex vacuum control system.

EP-A 0 584 646 and EP-A 0 389 939 describe the preparation of syndiotactic polystyrene in self-cleaning twin-screw extruders or compounders with no dead spaces. In both processes, owing to the sudden rise in frictional forces at higher levels of conversion, and to the motor output required for continued operation, polymerization is carried out not to complete conversion but only to a level where the polymer powder, soaked with monomers, no longer agglomerates in the course of subsequent processing steps.

In the case of anionic initiation, the technique of dispersion polymerization is known. It is employed specifically to prepare small polystyrene particles, as described for example in Journal of Polymer Science, Part A, Polymer Chemistry, Vol. 34 (1996), pages 2633–2649. Of critical importance is the selection of the dispersing auxiliary for stabilizing the dispersion.

DE-A 43 30 969 describes a process for preparing polystyrene mixtures by polymerizing styrene in an organic liquid in the presence of a styrene-butadiene block copolymer and of a metallocene catalyst system. For the preferred embodiment, however, pressures of from 5 to 20 bar are required; otherwise the resulting polymers have a very low molecular weight of around 30,000 g/mol.

It is an object of the present invention to provide a process for preparing syndiotactic vinylaromatic polymers using metallocene catalysts, which does not have the above disadvantages and can be carried out in customary stirred reactors at low viscosities.

We have found that this object is achieved by conducting the metallocene-catalyzed polymerization of vinylaromatic monomers in dispersion using styrene/diphenylethylene-diene block copolymers as dispersing auxiliaries.

Particularly suitable vinylaromatic compounds are those of the formula I

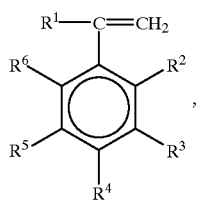

(I)

where
$R^1$ is hydrogen or $C_1$–$C_4$-alkyl,
$R^2$ to $R^6$ independently are hydrogen, $C_1$–$C_{12}$-alkyl, $C_6$–$C_{18}$-aryl or halogen, or two adjacent radicals together are cyclic groups having 4 to 15 carbons, for example $C_4$–$C_8$-cyclo-alkyl, or fused ring systems.

It is preferred to employ vinylaromatic compounds of the formula I in which
$R^1$ is hydrogen.

Particularly suitable substituents $R^2$ to $R^6$ are hydrogen, $C_1$–$C_4$-alkyl, chlorine or phenyl, biphenyl, naphthalene or anthracene. Two adjacent radicals may also together be cyclic groups having 4 to 12 carbons, so that compounds of the formula I may also, for example, be naphthalene derivatives or anthracene derivatives.

Examples of such preferred compounds are:
styrene, p-methylstyrene, p-chlorostyrene, 2,4-dimethylstyrene, 4-vinylbiphenyl, 2-vinylnaphthalene or 9-vinylanthracene.

It is also possible to employ mixtures of different vinylaromatic compounds, in which case one component may also carry further hydrocarbon radicals, such as vinyl, allyl, methallyl, butenyl or pentenyl groups, preferably vinyl groups, on the phenyl ring. It is preferred, however, to use only one vinylaromatic compound.

Particularly preferred vinylaromatic compounds are styrene and p-methylstyrene.

The preparation of vinylaromatic compounds of the formula I is known per se and is described, for example, in Beilstein 5, 367, 474, 485.

Suitable dispersion auxiliaries are block copolymers having at least one diene block B and at least one block S comprising a copolymer of a vinylaromatic monomer of the formula (I) and 1,1-diphenylethylene or its aromatic ring-substituted derivatives, including those substituted with alkyl of up to 22 carbons, as are described, for example, in DE-A 44 20 917.

Suitable examples are block copolymers with blocks S and B, of the general structures $(S—B)_n$, S—B—S, B—S—B, $X[(S—B)_n]_m$, $X[(BS)_n]_m$, $X(S—B—S)_m$ and $X(B—S—B)_m$, where X is the radical of an m-functional coupling agent or of an m-functional initiator, n is an integer from 1 to 5 and m is an integer from 2 to 20.

All dienes are suitable in principle as the diene component for the block B, although preference is given to those having conjugated double bonds, such as butadiene, isoprene, dimethylbutadiene and phenylbutadiene. The diene block may be partially or completely hydrogenated or unhydrogenated. The molecular weights Mw of the blocks B are generally from 10,000 to 500,000, preferably from 50,000 to 350,000 and, with particular preference, from 70,000 to 250,000, g/mol.

The blocks S consist of a copolymer of a vinylaromatic monomer of the formula (I) and 1,1-diphenylethylene or its ring-substituted derivatives, including those substituted with alkyl of up to 22 carbons, preferably of 1 to 4 carbons, such as methyl, ethyl, isopropyl, n-propyl and n-, iso- or tert-butyl. Particular preference, however, is given to the use of unsubstituted 1,1-diphenylethylene itself. The proportion of diphenylethylene in the block S is from 15 to 65% by weight, preferably from 25 to 60% by weight. The molar ratio of the units derived from the vinylaromatic monomer to units derived from 1,1-diphenylethylene is generally in the range from 1:1 to 1:25, preferably from 1:1.05 to 1:15 and, with particular preference, in the range from 1:1.1 to 1:10.

The copolymer block S is preferably random in composition and has a molecular weight Mw of in general from 20,000 to 500,000, preferably from 50,000 to 300,000. Particular preference is given to a copolymer block S of styrene and 1,1-diphenylethylene.

The block ratio S to B is generally in the range from 90:10 to 20:80, particularly preferably from 90:15 to 65:35. The block transitions can be either clean-cut or tapered. A tapered transition is one where the adjacent blocks B and S may, in the transition region, also contain monomers of the other block.

The block copolymers can be prepared by customary methods of anionic polymerization, as described for example in M. Morton, Anionic Polymerisation, Principles and Practice, Academic Press, New York 1983. The anionic polymerization is initiated by means of organometallic compounds. Preference is given to compounds of the alkali metals, especially of lithium. Examples of initiators are lithium alkyls such as methyllithium, ethyllithium, isopropyllithium, n-, sec- or tert-butyllithium. It is particularly preferred to employ n- or s-butyllithium. Suitable solvents are those which are inert toward the organometallic initiator. Aliphatic or aromatic hydrocarbons are judiciously used. Examples of suitable solvents are cyclohexane, methylcyclohexane, benzene, toluene, ethylbenzene and xylene.

To influence the polymerization parameters, small amounts of polar aprotic substances may be added to the solvent. Suitable examples are ethers, such as diethyl ether, diisopropyl ether, diethylene glycol dimethyl ether, diethylene glycol dibutyl ether or, in particular, tetrahydrofuran, and also tertiary amines, such as tetramethylethylenediamine or pyridine. The polar cosolvent is added to the apolar solvent in a small amount of from about 0.01 to 5% by volume. Particular preference is given to tetrahydrofuran in an amount of from about 0.1 to 0.3% by volume.

In a preferred embodiment of the novel process, at least one branching monomer can be employed.

As branching monomers it is possible to use compounds of the formula II

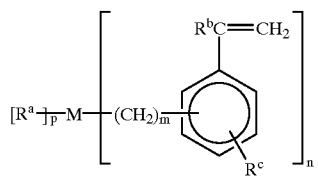

(II)

where $R^a$ is hydrogen, halogen or an inert organic radical of up to 20 carbons, where if $p \geq 2$ each $R^a$ can be identical or different and two radicals $R^a$ can form a 3- to 8-membered ring together with the metal atom attached to them, and $R^a$ can also be a customary complex ligand if M is a transition metal, $R^b$ is hydrogen, $C_1$–$C_4$-alkyl or phenyl;

$R^c$ is hydrogen, $C_1$–$C_4$-alkyl, phenyl, chlorine or an unsaturated hydrocarbon radical of 2 to 6 carbons;

M is C, Si, Ge, Sn, B, Al, Ga, N, P, Sb, Ti, Zr, Hf, V, Nb, Ta, Cr, Mo, W, Mn, Fe, Ru, Os, Co, Rh, Ir, Ni, Pd, Pt, Cu, Zn or Cd, n is 2–6;

m is 0–20;

p is 0–4;

with the proviso that the sum of n+p corresponds to the valency of M.

These monomers can be obtained, for example, by way of the Grignard compounds of the chloro(alkyl)styrenes with the corresponding carbon, metal or transition metal compounds, for example the halogen compounds. Where M is silicon, germanium or tin, for example, such reactions are described in K. Nakanishi, *J. Chem. Soc.* Perkin Trans I, 1990, page 3362.

Particularly preferred branching monomer units are those of the formula II in which M is carbon, silicon, germanium, tin or titanium, because they are easy to obtain. The index m is preferably from 0 to 8, particularly preferably from 0 to 4.

For example, the titanium-containing monomers of the formula IIa

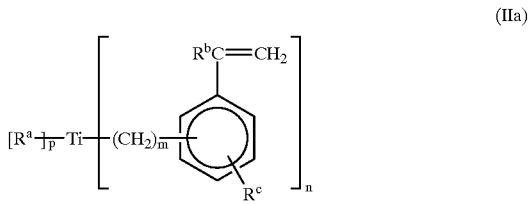

(IIa)

and the titanium compound IIb

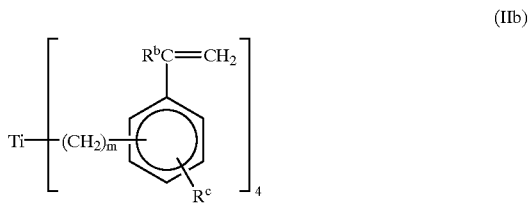

(IIb)

where $R^a$, $R^b$, $R^c$, m, n and p are as defined above, can be employed as branching monomers.

The inert organic radical or radicals $R^a$ are not of great importance to the process. Rather, they serve merely to satisfy the free valencies of M and can be selected for ease of availability. Examples of suitable radicals are aliphatic and cycloaliphatic radicals, aryls, hetaryls and aralkyls. Aliphatic radicals include alkyls, alkoxys, alkenyls or alkynyls having, for example, from 1 to 2 or 20 carbons. Cycloaliphatic radicals include cycloalkyls or cycloalkane radicals of 3 to 8 carbons. Instead of a methylene in the alkyl or cycloalkyl it is also possible for there to be an oxygen in ether function. Examples of aryls are phenyls or naphthyls, it also being possible for two phenyls to be connected by an oxygen. Examples of aralkyls are those of 7 to 20 carbons that result from combination of a phenyl with an alkyl. Examples of hetaryls are pyridyl, pyrimidyl and furyl. These radicals can also be substituted further, for example by alkyl, alkoxy, halogen, such as fluorine, chlorine or bromine, cyano, nitro, epoxy, carbonyl, ester groups, amides, and so on. Two of the radicals $R^a$ can also form a 3- to 6-membered ring with the atom M, for example where two radicals $R^a$ form an alkylene chain in which one or more $CH_2$ groups may also have been replaced by 0 in ether function.

If M is a transition metal, $R^a$ can also be a customary σ- or π- bonded complex ligand, such as ethylene, allyl, butadiene or cyclopentadiene, mono- or polysubstituted cyclopentadienes, such as methylcyclopentadiene or pentamethylcyclopentadiene, benzene, cyclohexadiene, cycloheptatriene, cycloheptadiene, cyclooctatetraene, cyclococtatriene, cyclooctadiene, carbonyl, oxalato, cyano, isonitrile, fulminato-C, fulminato-O, cyanato, dinitrogen, ethylenediamine, diethylenetriamine, triethylenetetramine, ethylenediaminetetraacetate, nitrosyl, nitro, isocyano, pyridine, α,α-bipyridyl, trifluorophosphane, phosphane, diphosphane, arsane, acetylacetonato.

$R^b$ is with particular preference hydrogen or methyl. $R^c$ is hydrogen, $C_1-C_4$-alkyl such as methyl, ethyl, propyl, isopropyl, n-butyl and the isomeric butyls, phenyl, chlorine or an unsaturated hydrocarbon radical of 2 to 6 carbons such as vinyl, allyl, methallyl, butenyl or pentenyl.

The branching monomer unit is judiciously employed in a molar ratio of vinylaromatic monomer to branching unit of from 10,000,000:1 to 10:1.

In accordance with the invention, transition metal complexes of subgroups II to VIII, preferably III to VIII, are used as catalyst component A). Very particular preference is given to complexes of the metals titanium, zirconium and hafnium.

If the branching monomer unit of the formula II already has a transition metal M, especially titanium, then depending on the concentration used it can also simultaneously be employed as catalyst component A in addition to its function as a branching unit.

Particularly preferred catalyst components A) are metallocene complexes, especially those of the formula III

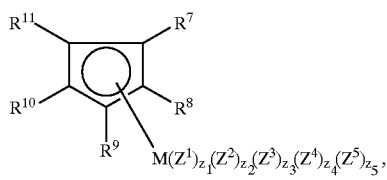

where
  $R^7$ to $R^{11}$ are hydrogen, $C_1-C_{10}$-alkyl, 5- to 7-membered cycloalkyl which in turn can carry $C_1-C_6$-alkyls as substituents, $C_6-C_{15}$-aryl or arylalkyl, and where two adjacent radicals may if desired together be cyclic groups of 4 to 15 carbons, for example fused ring systems is [sic] 4 to 12 carbons, or are $Si(R^{12})_3$,
  where $R^{12}$ is $C_1-C_{10}$-alkyl, $C_6-C_{15}$-aryl or $C_3-C_{10}$-cycloalkyl,
  M is a metal from subgroups III to VI of the Periodic Table of the Elements or is a metal of the lanthanide series,
  $Z^1$ to $Z^5$ are hydrogen, halogen, $C_1-C_{10}$-alkyl, $C_6-C_{15}$-aryl, $C_1-C_{10}$-alkoxy or $C_1-C_{15}$-aryloxy
  and
  $z_1$ to $z_5$ are 0, 1, 2, 3, 4 or 5, the sum $z_1+z_2+z_3+z_4+z_5$ corresponding to the valency of M minus 1.
Particularly preferred metallocene complexes of the formula III are those in which M is a metal from subgroup IV of the Periodic Table of the Elements, i.e. titanium, zirconium or hafnium, especially titanium,
and
  $Z^1$ to $Z^5$ are $C_1-C_{10}$-alkyl, $C_1-C_{10}$-alkoxy or halogen.
Examples of such preferred metallocene complexes are:
  pentamethylcyclopentadienyltitanium trichloride, pentamethylcyclopentadienyltitanium trimethyl and pentamethylcyclopentadienyltitanium trimethylate.
It is also possible to employ those metallocene complexes described in EP-A 584 646.

Mixtures of different metallocene complexes can also be used.

Complex compounds of this kind can be synthesized by methods known per se, preference being given to reacting the correspondingly substituted, cyclic hydrogen anions with halides of titanium, zirconium, hafnium, vanadium, niobium or tantalum.

Examples of appropriate preparation techniques are described, inter alia, in Journal of Organometallic Chemistry, 369 (1989), 359–370.

As compound B which forms cations, especially metallocenium ions, the catalyst systems can comprise open-chain or cyclic alumoxane compounds.

Suitable examples are open-chain or cyclic alumoxane compounds of the formula IV or V

or

where $R^{13}$ is $C_1-C_4$-alkyl, preferably methyl or ethyl, and k is an integer from 5 to 30, preferably from 10 to 25.

The preparation of these oligomeric alumoxane compounds is usually carried out by reacting a solution of a trialkylaluminum with water and is described, inter alia, in EP-A 284 708 and U.S. Pat. No. 4,794,096.

In general, the oligomeric alumoxane compounds obtained are in the form of mixtures of both linear and cyclic chain molecules of different lengths, so that k is to be regarded as an average value. The alumoxanes may also be present in a mixture with other metal alkyls, preferably with aluminum alkyls.

It has been found advantageous to use the metallocene complexes and the oligomeric alumoxane compound in amounts such that the atomic ratio between aluminum from the oligomeric alumoxane and the transition metal from the metallocene complexes is in the range from 10:1 to $10^6$:1, in particular from 10:1 to $10^4$:1.

As compound B) forming metallocenium ions it is also possible to employ coordination complex compounds selected from the group consisting of strong, neutral Lewis acids, ionic compounds having Lewis-acid cations and ionic compounds having Brönsted acids as cations.

Preferred strong neutral Lewis acids are compounds of the formula VI

where
- $M^1$ is an element from main group III of the Periodic Table, especially B, Al or Ga, preferably B,
- $X^1, X^2$ and $X^3$ are hydrogen, $C_1$–$C_{10}$-alkyl, $C_6$–$C_{15}$-aryl, alkylaryl, arylalkyl, haloalkyl or haloaryl each of 1 to 10 carbons in the alkyl and 6 to 20 carbons in the aryl, or are fluorine, chlorine, bromine or iodine, especially haloaryls, preferably pentafluorophenyl.

Particular preference is given to compounds of the formula VI in which $X^1$, $X^2$ and $X^3$ are identical; preferably tris(pentafluorophenyl)borane. These compounds and processes for their preparation are known per se and are described, for example, in WO93/3067.

Suitable ionic compounds having Lewis-acid cations are compounds of the formula VII

$$[(Y^{a+})Q_1Q_2\ldots Q_z]^{d+} \quad (VII)$$

where
- Y is an element from main groups I to VI or subgroups I to VIII of the Periodic Table,
- $Q_1$ to $Q_z$ are radicals with a single negative charge, such as $C_1$–$C_{28}$-alkyl, $C_6$–$C_{15}$-aryl, alkylaryl, arylalkyl, haloalkyl or haloaryl each having 6 to 20 carbons in the aryl and 1 to 28 carbons in the alkyl, $C_1$–$C_{10}$-cycloalkyl, which can be unsubstituted or substituted by $C_1$–$C_{10}$-alkyls, or are halogen, $C_1$–$C_{28}$-alkoxy, $C_6$–$C_{15}$-aryloxy, silyl or mercaptyl, such as trimethylsilyl,
- a is an integer from 1 to 6,
- z is an integer from 0 to 5, and
- d corresponds to the difference a–z, but is greater than or equal to 1.

Particular suitability is possessed by carbonium cations, oxonium cations and sulfonium cations, and also cationic transition metal complexes. Particular mention may be made of the triphenylmethyl, silver and 1,1'-dimethylferrocenyl cations.

They preferably have noncoordinating counterions, especially boron compounds, as also mentioned in WO 91/09882, preferably tetrakis(pentafluorophenyl) borate.

Ionic compounds with Brönsted acids as cations and preferably also with likewise noncoordinated counterions are specified in WO 93/3067; a preferred cation is N,N-dimethylanilinium.

It has been found to be particularly appropriate if the molar ratio of boron from the compound that forms metallocenium ions to transition metal from the metal complex is in the range from 0.1:1 to 10:1, in particular from 1:1 to 5:1.

The catalyst system employed in the novel process may include as component C) an aluminum compound, for example of the formula VIII

$$AlR^{14}R^{15}R^{16} \quad (VIII),$$

where
- $R^{14}$ to $R^{16}$ are hydrogen, fluorine, chlorine, bromine, iodine or $C_1$–$C_{12}$-alkyl, preferably $C_1$–$C_8$-alkyl.

Preferably, $R^{14}$ to $R^{15}$ are identical and are $C_1$–$C_6$-alkyl, such as methyl, ethyl, isobutyl or n-hexyl, and $R^{16}$ is hydrogen.

The content of component C) in the catalyst system is preferably from 1:2000 to 1:1, in particular from 1:800 to 1:10 (molar ratio of transition metal from III to Al from VIII).

As solvents for the metallocene complexes it is common to employ aromatic hydrocarbons, preferably those having 6 to 20 carbons, and especially xylenes, toluene and ethylbenzene and mixtures thereof.

The metallocene complexes can be employed with or without a support.

Examples of suitable support materials are silica gels, preferably those of the formula $SiO_2 \cdot bAl_2O_3$, where b is a number from 0 to 2, preferably from 0 to 0.5; i.e. essentially alumosilicates or silicon dioxide. The supports preferably have a particle diameter of from 1 to 200 μm, in particular from 30 to 80 μm. Such products are obtainable commercially, for example as silica gel 332 from Grace.

Further supports include finely divided polyolefins, for example finely divided polypropylene or polyethylene, and also polyethylene glycol, polybutylene terephthalate, polyethylene terephthalate, polyvinyl alcohol, polystyrene, syndiotactic polystyrene, polybutadiene, polycarbonates and copolymers thereof.

The molar ratio of transition metal catalyst A) to vinylaromatic monomer is generally from 1:1000 to 1:10,000,000, but preferably from 1:2000 to 1:1,000,000.

The process according to the invention is conducted as a dispersion polymerization. The dispersing medium employed may judiciously comprise aliphatic hydrocarbons, especially those of 4 to 10 carbon atoms, or hydrocarbon mixtures. Examples are butane, pentane, hexane and heptane. The concentration of the monomers that are to be polymerized in the dispersion medium is in general from 5 to 65 percent by volume, preferably from 10 to 50% by volume.

The dispersing auxiliary is preferably used in an amount of from 0.1 to 10% by weight, particularly preferably from 1 to 8% by weight, based on the vinylaromatic compound employed. It is judiciously dissolved in the vinylaromatic monomer that is to be polymerized.

The polymerization conditions are not critical. Polymerization is preferably conducted at from 50 to 100° C. under a pressure of from 0.05 to 30 bar, preferably from 0.1 to 20 bar. The polymerization is generally at an end after from 0.5 to 10 hours. It can be terminated by adding protic compounds, for example methanol, and the dispersion medium can be removed by filtration or evaporation and recycled to the process.

The novel process is technically simple and permits the preparation of vinylaromatic polymers having a high syndiotactic content with low viscosities of less than 4 mPas in customary stirred vessels. Furthermore, the polymers are obtained in particulate form. The resultant polymers are suitable for producing fibers, films and moldings.

The preferred procedure in the novel process is to prepare a solution of the dispersing auxiliary in the vinylaromatic monomer, with a concentration of from 0.1 to 10% by weight, preferably from 1 to 8% by weight, based on the vinylaromatic compound, and to heat the resulting solution with, say, pentane to 30° C., for example. Then the calculated amount of the catalyst components is added and polymerization is conducted at from 60 to 70° C. and is allowed to proceed to completion (about 1 hour) before being terminated with methanol.

The dispersion medium can be removed by filtration or by evaporation and the solid obtained can be dried under reduced pressure. If desired, the polymer can be purified by customary methods of plastics technology, for example by reprecipitation or by washing with acids or alkalis.

EXAMPLES

Purifying 1,1-diphenylethylene (DPE)

Crude DPE (Aldrich or prepared by reacting phenylmagnesium bromide with acetophenone, acetylating with acetic anhydride and thermally eliminating the acetic acid) is distilled to 99.8% purity on a column having at least 50 theoretical plates (spinning band column; for larger quantities, a column with Sulzer packing). The distillate, which is usually pale yellow, is filtered through a 20 cm alox column (Woelm alumina for chromatography, anhydrous), titrated with 1.5 N sec-butyllithium until there is a strong red coloration, and distilled over under reduced pressure (1 mbar). The resulting product is completely colorless and can be employed directly in the anionic polymerization.

Purifying the monomers and solvent

The cyclohexane (H) employed as solvent was dried over anhydrous alumina and titrated with the adduct of sec-butyllithium and 1,1-diphenylethylene until a yellow coloration was obtained. The butadiene (Bu) was distilled off from triisobutylaluminum, the 1,1-diphenylethylene (DPE) from sec-butyllithium (s-BuLi). A 0.5 molar solution of s-BuLi in cyclohexane was used as initiator. Styrene (S) was dried over alumina directly before use.

All polymerizations were conducted under purified nitrogen with rigorous exclusion of air and moisture. The reactors were pretreated for a number of hours with a solution of 1,1-diphenylethylene and sec-butyllithium in cyclohexane under reflux before being filled.

In the Examples below, Bu is 1,3-butadiene, S is styrene and DPE is 1,1-diphenylethylene. Also, the proportions are by weight.

Preparing Bu-S/DPE block copolymers

Dispersant D1

7.1 l of cyclohexane and a few drops (about 2 ml) of DPE were charged to a 10 l stirred reactor and titrated with a 0.278 molar sec-butyllithium solution until the mixture began to take on a red coloration. Following the addition of 15.1 ml (4.2 mmol) of the 0.278 molar sec-butyllithium solution, 1.6 l (19.4 mol)) of 1,3-butadiene were added in portions (100 ml) over the course of one hour at 70° C. and the mixture was polymerized at 70° C. for a further hour. The molecular weights of the resulting polybutadiene block were determined on a sample by means of gel permeation chromatography (GPC) with polybutadiene calibration: $M_w$=248,000 g/mol, $M_w/M_n$=1.28, M (peak maximum)= 226,000 g/mol. To the resulting polybutadiene block there were added, in succession at an interval of 15 minutes, 98.3 ml (0.56 mol) of 1,1-diphenylethylene and 259 ml (2.25 mol) of styrene, and polymerization was continued at 70° C. for 5 hours more. After the reaction had subsided, the reaction mixture was titrated with ethanol until it became colorless and was acidified with $CO_2$/water. The colorless solution was freed from solvent under reduced pressure in a devolatilizing extruder, and the product was granulated.

GPC (polybutadiene calibration): two peaks: 1st peak (20%) M (peak maximum)=32,000 g/mol; 2nd peak (80%): peak maximum at 260,000 g/mol.

Dispersant D2

Following the procedure used for dispersant D1, 1.6 l of 1,3-butadiene, 98.3 ml of 1,1-diphenylethylene and 259 ml (2.25 mol) of styrene were polymerized, the polymerization being initiated with 10 ml (2.78 mmol) of a 0.278 molar sec-butyllithium solution.

GPC polybutadiene block (polybutadiene calibration): $M_w$=441,000 g/mol, $M_w/M_n$=1.25, M (peak maximum)= 352,000 g/mol GPC block copolymer (polybutdiene calibration): two peaks, 1st peak (20%) M (peak maximum)=61,000 g/mol; 2nd peak (80%): peak maximum at 411,000 g/mol.

Dispersant D3

Following the procedure used for dispersant D1, 1.2 l (14.5 mol) of 1,3-butadiene, 73.6 ml (0.42 mol) of 1,1-diphenylethylene and 194 ml (1.69 mol) of styrene were polymerized, the polymerization being initiated with 7.5 ml (2.08 mmol) of a 0.278 molar sec-butyllithium solution.

GPC polybutadiene block (polybutadiene calibration): $M_w$=379,000 g/mol, $M_w/M_n$=1.30, M (peak maximum)= 324,000 g/mol GPC block copolymer (polybutadiene calibration): two peaks, 1st peak (30%) M (peak maximum)=57,000 g/mol; 2nd peak (70%): peak maximum at 394,000 g/mol.

Preparing an S/DPE-Bu-S/DPE triblock copolymer

Dispersant D4

Following the procedure used for dispersant D1, 1.08 l (13.1 mol) of 1,3-butadiene, 149.5 ml (0.85 mol) of 1,1-diphenylethylene and 252.4 ml (2.2 mol) of styrene were polymerized, the polymerization being initiated with 49.1 ml (13.7 mmol) of a 0.278 molar sec-butyllithium solution. The polymerization was not terminated with ethanol, but instead a solution of 0.5 g of ethyl formate (coupling agent) in 10 ml of cyclohexane was added over the course of 5 minutes. Working up was as described for dispersant 1.

GPC block copolymer (mixed calibration for polystyrene and polybutadiene 40:60): two peaks: 1st peak (10%) M (peak maximum) =79,000 g/mol; 2nd peak (90%): peak maximum at 160,000 g/mol.

Example 1

250 ml of n-hexane and a mixture of 2.61 g of the dispersant D1 in 104.2 g (1 mol) of styrene were introduced with stirring into a 2 l stirred reactor and heated to 60° C. 8.16 ml of a 1.53 molar solution of methylaluminoxane (MAO) in toluene (obtained from Witco), 2.08 ml of a 1.0 molar solution of diisobutylaluminum hydride (DIBAH) in cyclohexane (obtained from Aldrich) and 9.5 mg (0.04 mmol) of pentamethylcyclopentadienyltitanium trimethyl Cp*TiMe$_3$ were added. After 5 minutes, a milky dispersion had formed. The viscosity of the dispersion remained below 1.4 mPas throughout the reaction period. After 2 hours, the polymerization was terminated by adding 10 ml of methanol and the reaction mixture was filtered. The filter residue was washed with methanol and dried at 50° C. under reduced pressure.

The amount of dispersant was 2.5% by weight based on the amount of styrene employed. The conversion, based on the amount of styrene employed, was 33%. The molecular weight Mw and the molecular weight distribution were determined by high-temperature gel permeation chromatography GPC (135° C., 1,2,4-trichlorbenzene, polystyrene standard) as $M_w$=201,200, Mw/Mn=1.9. The syndiotactic content as determined by $^{13}$C—NMR spectroscopy was 96%. The particle size was in the range from 2 to 10 μm and was determined under the transmission microscope (Axiophot from Carl Zeiss) on a sample of the polymer suspended in immersion oil and placed between two planar glass slides.

Examples 2 to 5

Example 1 was repeated with in each case 2.5% by weight of dispersants D2, D3 and D4 or a 1:1 mixture of the dispersants D1 and D2, based in each case on the amount of styrene employed. The results are summarized in Table 1.

Comparison Experiment V1

Example 1 was repeated without the use of a dispersant. The resulting polymer precipitated after only 10 minutes.

The conversion, based on the styrene employed, was only 16%.

| Example | Dispersant | $M_w$ [g/mol] | $M_w/M_n$ | Viscosity [mPas] | Conversion [%] | Syndiotacticity [%] |
|---|---|---|---|---|---|---|
| 1 | D1 | 201,200 | 1.9 | 1.34 | 33 | 98 |
| 2 | D2 | 467,400 | 2.5 | 2.11 | 63 | 95 |
| 3 | D3 | 367,800 | 2.3 | 1.96 | 59 | 97 |
| 4 | D1 + D2 (each 1.25% by wt.) | 441,000 | 2.7 | 2.20 | 72 | 98 |
| 5 | D4 | 501,300 | 2.6 | 2.31 | 86 | 96 |
| V1 | — | 248,200 | 2.1 | | 16 | 96 |

We claim:

1. A process for preparing polymers of vinylaromatic compounds in dispersion in the presence of a dispersing auxiliary and a catalyst obtained from A) a transition metal complex of subgroups II to VII, B) a cation-forming agent and C), optionally, an aluminum compound, wherein the dispersing auxiliary used comprises block copolymers having at least one diene block B and at least one block S comprising a copolymer of a vinylaromatic monomer and 1,1-diphenylethylene 1,1-diphenylethylene substituted by alkyl groups of up to 22 carbons.

2. A process as defined in claim 1, wherein the dispersing auxiliary used comprises block copolymers having at least one diene block B and at least one block S comprising a copolymer is of a vinylaromatic monomer and 1,1- or its aromatic ring-substituted derivatives, including those substituted by alkyls of up to 22 carbons.

3. A process as defined in claim 2, wherein the block copolymer comprises polybutadiene or polyisoprene in copolymerized form and the diene block B is partially or completely hydrogenated or unhydrogenated.

4. A process as defined in either of claims 2 and 3, wherein the block S of the block copolymer consists of a copolymer of styrene and 1,1-diphenylethylene.

5. A process as defined in any of claims 1 to 4, wherein the dispersing auxiliary is used in an amount of from 0.1 to 10% by weight, based on the amount of vinylaromatic compound employed.

6. A process as defined in any of claims 1 to 5, wherein aliphatic hydrocarbons are used as dispersion medium.

7. A process as defined in any of claims 1 to 6, wherein a branching monomer unit comprising at least two vinylaromatic radicals is used in a molar ratio of vinylaromatic monomers to branching units of from 10,000,000:1 to 10:1.

8. A process as defined in any of claims 1 to 7, wherein the catalyst component A) employed is a metallocene complex of the formula (III)

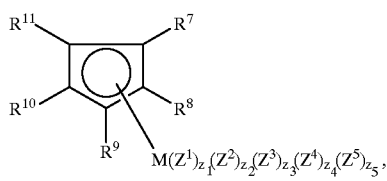

where $R^7$ to $R^{11}$ are hydrogen, $C_1$–$C_{10}$-alkyl, 5- to 7-membered cycloalkyl which in turn can carry $C_1$–$C_6$-alkyls as substituents, $C_6$–$C_{15}$-aryl or arylalkyl, and where two adjacent radicals may if desired together be cyclic groups of 4 to 15 carbons, or are $Si(R^{12})_3$, where $R^{12}$ is $C_1$–$C_{10}$-alkyl, $C_6$–$C_{15}$-aryl or $C_3$–$C_{10}$-cycloalkyl, M is a metal from subgroups III to VI of the Periodic Table of the elements or is a metal of the lanthanide series, $Z^1$ to $Z^5$ are hydrogen, halogen, $C_1$–$C_{10}$-alkyl, $C_6$–$C_{15}$-aryl, $C_1$–$C_{10}$-alkoxy or $C_1$–$C_{15}$-aryloxy and $z_1$ to $z_5$ are 0, 1, 2, 3, 4 or 5, the sum $z_1+z_2+z_3+z_4+z_5$ corresponding to the valency of M minus 1.

9. A process as defined in claims 1 to 8, wherein the cation-forming compound B) employed comprises open-chain or cyclic alumoxane compounds of the formula IV or V

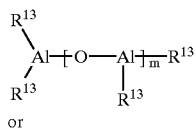

or

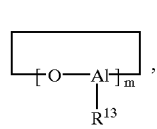

where $R^{13}$ is $C_1$–$C_4$-alkyl and m is an integer from 5 to 30.

10. A process as defined in any of claims 1 to 8, wherein the cation-forming compound B) employed is a coordination complex compound selected from the group consisting of strong, neutral Lewis acids, ionic compounds having Lewis-acid cations and ionic compounds having Brönsted acids as cations.

* * * * *

UNITED STATES PATENT AND TRADEMARK OFFICE
CERTIFICATE OF CORRECTION

PATENT NO. : 6,235,838 B1
DATED : May 22, 2001
INVENTOR(S) : Wuensch et al.

Page 1 of 1

It is certified that error appears in the above-identified patent and that said Letters Patent is hereby corrected as shown below:

Column 11, claim 2,
Lines 29-34, delete the entire claim and replace with:
-- 2. A process as defined in claim 1, wherein the proportion of 1,1-dipehnylethylene in the block S of the dispersing auxiliary is from 15 to 65% by weight. --

Column 11, claim 3,
Line 35, "claim 2" should be -- claim 1 --.

Column 11, claim 4,
Line 39, "either of claims 2 and 3" should be -- claim 1 --.

Column 11, claim 5,
Line 42, "any of claims 1 to 4" should be -- claim 1 --.

Column 11, claim 6,
Line 46, "any of claims 1 to 5" should be -- claim 1 --.

Column 11, claim 7,
Line 48, "any of claims 1 to 6" should be -- claim 1 --.

Column 11, claim 8,
Line 52, "any of claims 1 to 7" should be -- claim 1 --.

Column 12, claim 9,
Line 28, "claims 1 to 8" should be -- claim 1 --.

Column 12, claim 10,
Line 47, "any of claims 1 to 8" should be -- claim 1 --.

Signed and Sealed this

Twentieth Day of November, 2001

Attest:

NICHOLAS P. GODICI
*Attesting Officer*  *Acting Director of the United States Patent and Trademark Office*